United States Patent
Amir

(10) Patent No.: US 12,274,309 B2
(45) Date of Patent: *Apr. 15, 2025

(54) BURNING PREDICTION AND COMMUNICATIONS FOR AN ELECTRONIC CIGARETTE

(71) Applicant: Altria Client Services LLC, Richmond, VA (US)

(72) Inventor: Nehemia Amir, Shoham (IL)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 177 days.

This patent is subject to a terminal disclaimer.

(21) Appl. No.: 18/153,613

(22) Filed: Jan. 12, 2023

(65) Prior Publication Data

US 2023/0142151 A1 May 11, 2023

Related U.S. Application Data

(60) Continuation of application No. 16/894,152, filed on Jun. 5, 2020, now Pat. No. 11,571,026, which is a
(Continued)

(51) Int. Cl.
*A24F 40/53* (2020.01)
*A24F 40/10* (2020.01)
(Continued)

(52) U.S. Cl.
CPC ............. *A24F 40/53* (2020.01); *A24F 40/50* (2020.01); *G06N 5/04* (2013.01); *H05B 1/0244* (2013.01);
(Continued)

(58) Field of Classification Search
CPC ......... A24F 40/10; A24F 40/53; G06F 9/3004
See application file for complete search history.

(56) References Cited

U.S. PATENT DOCUMENTS 4,808,012 A 2/1989 Otto
4,922,901 A 5/1990 Brooks et al.
(Continued)

FOREIGN PATENT DOCUMENTS

AR 082377 A1 * 12/2012 ............. A24F 47/00
CN 102832669 A 12/2012
(Continued)

OTHER PUBLICATIONS

Lessons In Electric Circuits, Kuphaldt, T. R., https://www.ibiblio.org/kuphaldt/electricCircuits/Ref/REF_9.html (Year: 2013).
(Continued)

*Primary Examiner* — Russell E Sparks
(74) *Attorney, Agent, or Firm* — Harness, Dickey & Pierce, P.L.C.

(57) ABSTRACT

An electronic cigarette comprises a battery portion which is operable to provide power to a heating element of the electronic cigarette, and a cartomizer coupled with the battery portion. The cartomizer comprises a liquid container which provides a liquid toward the heating element wherein the liquid is used for producing and flavoring a vapor of the electronic cigarette when the liquid is heated by the heating element, and a memory which is operable to record and store an amount of the liquid remaining in the liquid container.

20 Claims, 5 Drawing Sheets

Related U.S. Application Data division of application No. 15/193,540, filed on Jun. 27, 2016, now Pat. No. 10,701,971, which is a division of application No. 14/280,299, filed on May 16, 2014, now abandoned.

(60) Provisional application No. 61/825,304, filed on May 20, 2013.

(51) Int. Cl.
| | | |
|---|---|---|
| *A24F 40/50* | (2020.01) | |
| *G06N 5/04* | (2023.01) | |
| *H05B 1/02* | (2006.01) | |
| *A24F 40/65* | (2020.01) | |
| *G06F 9/30* | (2018.01) | |

(52) U.S. Cl.
CPC .............. *A24F 40/10* (2020.01); *A24F 40/65* (2020.01); *G06F 9/3004* (2013.01); *H05B 2203/021* (2013.01)

(56) References Cited

U.S. PATENT DOCUMENTS

| | | | |
|---|---|---|---|
| 6,940,187 | B2 | 9/2005 | Escobar et al. |
| 8,550,069 | B2 | 10/2013 | Alelov |
| 8,820,330 | B2 | 9/2014 | Bellinger et al. |
| 8,910,640 | B2 * | 12/2014 | Sears .................. F22B 1/28 131/194 |
| 9,497,999 | B2 * | 11/2016 | Lord .................. H02J 7/345 |
| 9,700,074 | B2 | 7/2017 | Liu |
| 9,763,476 | B2 | 9/2017 | Flick |
| 10,226,078 | B2 * | 3/2019 | Peleg .................. A24F 40/10 |
| 10,701,971 | B2 * | 7/2020 | Amir .................. A24F 40/53 |
| 11,571,026 | B2 * | 2/2023 | Amir .................. A24F 40/50 |
| 2011/0265806 | A1 | 11/2011 | Alarcon et al. |
| 2012/0048266 | A1 | 3/2012 | Alelov |
| 2013/0220315 | A1 | 8/2013 | Conley et al. |
| 2013/0284192 | A1 | 10/2013 | Peleg et al. |
| 2013/0319435 | A1 | 12/2013 | Flick |
| 2014/0020693 | A1 | 1/2014 | Cochand et al. |
| 2014/0041658 | A1 | 2/2014 | Goodman et al. |

FOREIGN PATENT DOCUMENTS

| | | | |
|---|---|---|---|
| CN | 102970885 | A | 3/2013 |
| EP | 2399636 | A1 | 12/2011 |
| EP | 2468116 | A1 | 6/2012 |
| EP | 2468117 | A1 | 6/2012 |
| WO | WO-2011160788 | A1 * | 12/2011 ........... A24F 47/008 |
| WO | WO-2012/085203 | A1 | 6/2012 |
| WO | WO-2012/085207 | A1 | 6/2012 |

OTHER PUBLICATIONS

International Search Report and Written Opinion dated Feb. 5, 2015.
International Search Report and Written Opinion dated Apr. 22, 2015.
Office Communication for European Application No. 14 792 859.2 dated Nov. 14, 2017.
Office Action for corresponding Chinese Application No. 201480041079.0 dated Dec. 1, 2017 and English translation thereof.
Office Action for corresponding Russian Application No. 2015154557 dated Apr. 24, 2018 and English translation thereof.
U.S. Office Action issued in co-pending U.S. Appl. No. 14/280,299 dated Jun. 13, 2018.
Office Action for corresponding European Application No. 14792859.2 dated Jun. 26, 2018.
Chinese Office Action issued Sep. 5, 2018 in related Chinese Application No. 201480041079.0.
Russian Office Action dated Sep. 10, 2018 for corresponding PCT Application No. PCT/IB2014/002071 filed May 20, 2014.
Communication issued Nov. 30, 2018 in European Application No. 14792859.2.
Storing Energy in a Capacitor, HyperPhysics, Department of Physics and Astronomy, Georgia State University, http://hyperphysicsphy-astr.gsu.edu/hbase/electric/capeng2.html (Year:2016).
Parallel Circuits, Ag Power Web Enhanced Course Materials, Southwest Wisconsin Technical College, https://www.swtc.edu/Ag_Power/electrical/lecture/parallel_circuits.htm (Year: 2018).
Current and Resistance, Physics Department, Boston University, http://physics.bu.edu//PY106/Resistan.
U.S. Office Action dated Dec. 28, 2018 issued in co-pending U.S. Appl. No. 15/193,540.
Malaysian Office Action dated Feb. 28, 2019 issued in corresponding Malaysian Application No. PI2015002774.
Chinese Office Action dated Apr. 1, 2019 issued in corresponding Chinese Application No. 201480041079.0 (with translation).
Final Office Action issued May 15, 2019 in U.S. Appl. No. 15/193,540.
Notice of Allowance issued Dec. 27, 2019 in U.S. Appl. No. 15/193,540.
Notice of Allowance issued Mar. 11, 2020 in U.S. Appl. No. 15/193,540.

* cited by examiner

BURNING PREDICTION AND COMMUNICATIONS FOR AN ELECTRONIC CIGARETTE

CROSS REFERENCE TO RELATED APPLICATION

This application is a Continuation application of U.S. application Ser. No. 16/894,152, filed on Jun. 5, 2020, which is a Divisional application of U.S. patent application Ser. No. 15/193,540, filed on Jun. 27, 2016, which is a Divisional application of U.S. patent application Ser. No. 14/280,299, filed on May 16, 2014, which claims priority under 35 U.S.C. § 119(e) to U.S. Provisional Application No. 61/825,304, filed on May 20, 2013, the entire contents of each of which are incorporated herein by reference.

BACKGROUND

An electronic cigarette ("e-cigarette" or "e-Cig") is a device that emulates tobacco cigarette smoking, by producing smoke replacement (e.g. vapor or aerosol) that may be similar in its physical sensation, general appearance, and sometimes flavor (i.e., with tobacco fragrance, menthol taste, added nicotine etc.). The device may use heat, ultrasonic energy, or other means to vaporize/aerosolize a liquid (for example based on propylene glycol, or glycerin, for example including taste and fragrance ingredients) solution into an aerosol mist. The vaporization may be similar to nebulizer or humidifier vaporizing solutions for inhalation. The generated mist may be sensed similar to cigarette smoke.

A common problem in electronic cigarettes ("e-Cigs") may be burning. Burning may occur when a cartridge filled with a liquid becomes empty. In other words, burning may occur when the liquid has evaporated or been vaporized as part of the e-Cig smoking process. Burning may result in bad taste and less pleasure when smoking. A smoker of an e-Cig may not be able to predict when the burning will occur.

SUMMARY

Disclosed herein is an electronic cigarette which comprises a battery portion which is operable to provide power to a heating element of the electronic cigarette, and a cartomizer coupled with the battery portion. The cartomizer comprises a liquid container which provides a liquid toward the heating element wherein the liquid is used for producing and flavoring a vapor of the electronic cigarette, the heating element generates the vapor from the liquid contained in the liquid container, and a memory which is operable to record and store an amount of the liquid remaining in the liquid container.

Also disclosed herein is an electronic cigarette which comprises a battery portion including a battery that provides power to a heating element of the electronic cigarette, and a cartomizer coupled with the battery portion. The cartomizer comprises the heating element which generates a vapor, a liquid container which provides a liquid to the heating element which is used to form the vapor, wherein the liquid is used for flavoring the vapor, and a temperature sensor for sensing the temperature of the heating element.

Additionally disclosed herein is an electronic cigarette which comprises a battery portion including a battery that provides power to a heating element of the electronic cigarette, and a cartomizer coupled with the battery portion. The cartomizer comprises the heating element which generates a vapor, the heating element including a heating coil which supplies the heat to a liquid delivered to the heating element when powered by the battery, a liquid container which delivers the liquid to the heating element, the liquid used for flavoring the vapor, and a coil resistance measurement system that measures the resistance of the heater coil during use of the electronic cigarette.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating principles of operation of the components. In the drawings, like referenced numerals designate corresponding parts throughout the different views.

DETAILED DESCRIPTION

Figure 1:
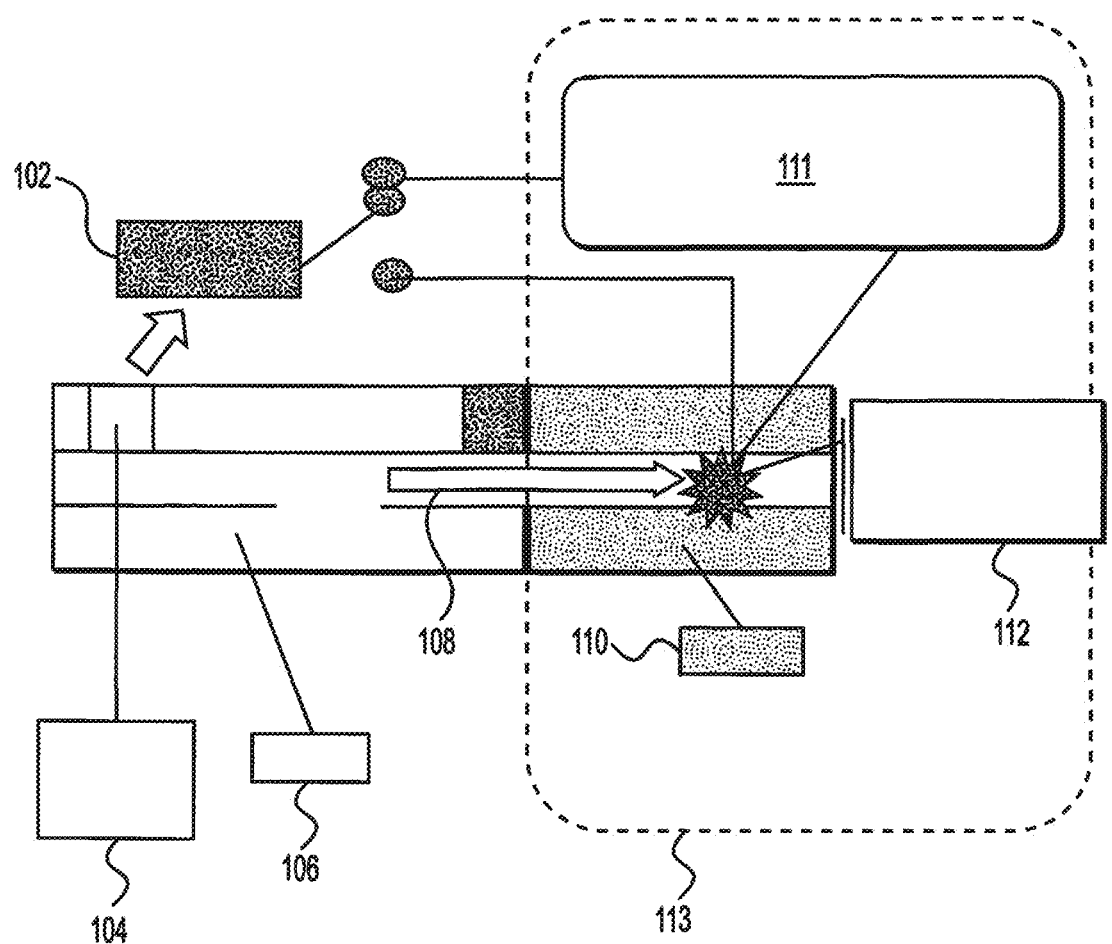
FIG. 1 is a diagram of an electronic cigarette.

The system and method described herein may solve the burning problem by cutting off power to the cartridge of the e-Cig or adjusting power to the cartridge of the e-Cig before burning occurs. The power to the cartridge may be stopped based on the residual liquid in the cartridge. This action may give the smoker more puffs per e-Cig. Smart algorithms may automatically adjust the power to the cartridge during smoking.

Subject matter will now be described more fully hereinafter with reference to the accompanying drawings, which form part of the specification hereof, and which show, by way of illustration, specific examples of embodiments disclosed herein. Subject matter may, however, be embodied in a variety of different forms and, therefore, covered or claimed subject matter is intended to be construed as not being limited to any example embodiments set forth herein as example embodiments are provided merely to be illustrative. Likewise, a reasonably broad scope for claimed or covered subject matter is intended. Among other things, for example, subject matter may be embodied as methods, devices, components, or systems. Accordingly, embodiments disclosed herein may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of examples of embodiments disclosed herein in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

By way of introduction, an improvement to an electronic cigarette ("e-Cig") may include detection of potential burning for burning reduction/elimination. In addition, the e-Cig may include temperature control. In one embodiment, a memory may be included with the cartomizer that records the liquid level for predicting when the liquid will run out. In addition to memory, a communication function may be provided on the cartomizer for communicating information, such as an amount of liquid remaining. The cartomizer may be disposable, but the memory can record the liquid level and allow for a cartomizer to be switched to different e-Cigs. The memory may store the accumulated operation time (as well as other parameters) that can be adapted by the e-Cig controller during smoking and may represent the age of the cartomizer of the e-Cig. Although commonly referred to as a smoker throughout, a user of an e-Cig may also be referred to as a vaper and the act of "smoking" may be referred to as vaping. Likewise, a non-electronic cigarette may be referred to as a "regular" or "standard" cigarette, but should be understood to include nonelectronic cigarettes.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

FIG. 1 is a diagram of an electronic cigarette. The "smoke" (e.g. vapor or aerosol) produced by an e-Cig is a created by turning (i.e. generating) a liquid (i.e. e-Liquid) 110 into mist (aerosol) and some vapor with an aerosol generator 112. The cartomizer 113 may include the aerosol generator 112 and the e-Liquid 110 in a liquid container. The cartomizer 113 may also be referred to as a cartridge throughout this disclosure and may be disposable. The e-liquid 110 may have a high viscosity at room temperature to enable longer shelf life and reduce leakages; however, this high viscosity may reduce the vaporization rate. The e-Liquid 110 is vaporized via air flow 108, generated by the inhalation of a user (i.e. the smoker, consumer or vaper), which produces a pressure difference that removes e-Liquid droplets from the e-Liquid 110. In one embodiment, the e-Liquid 110 may be soaked in a wick. In order to reduce the e-Liquid viscosity, to a level enabling vaporization, external heat may be applied through a heating element 111 as further described below. In this embodiment, local viscosity reduction via heating, while inhalation occurs, enables e-Liquid vaporization in the inhalation-generated flow of air 108. The e-Liquid 110 may be heated via an electric current flowing through the heating element 111 and may then be vaporized through the e-Cig wherein the e-Liquid 110 may contain tastes and aromas that create a smoking sensation. The controller 102 may be activated due to air flow 108 (from the inhaled air) passing a flow sensor 104. The sensor 104 may be activated by the pressure drop across the sensor and may directly switch the battery 106 power on, or be used as an input for the controller 102 that then switches the battery 106 current on. Although illustrated as separate from the e-Cig, the controller 102 may be a part of the e-Cig (e.g. along with the battery 106). The battery 106 may be a separate/removable assembly. The battery 106 may include one or more electronic chips which control and communicate therewith. The battery 106 may connect with the cartomizer 113, which can be replaced or changed (e.g. when a new/different e-Liquid 110 is desired).

The e-Cig may include two parts. The first part is often just referred to as the battery or battery portion (i.e. battery enclosure) and it includes the battery 106, the air flow sensor 104 and the controller 102. The second part is the cartridge (i.e. cartomizer 113) that is filled up with e-Liquid 110 and flavors that are required for smoke and flavor generation. The battery portion and the cartomizer 113 may be connected by metal connectors. An airflow tube of the battery enclosure and an airflow tube of the cartomizer 113 may enable the smoker to puff through the electronic cigarette and activate the airflow sensor 104 inside the battery portion. This may trigger the controller 102 and cause the heating element 111 (such as a wire heating coil) inside the cartridge to get hot, evaporate the e-Liquid that is in the cartomizer 113 and cause smoke (i.e. vapor) to be produced. The process is further explained in FIG. 2.

Figure 2:
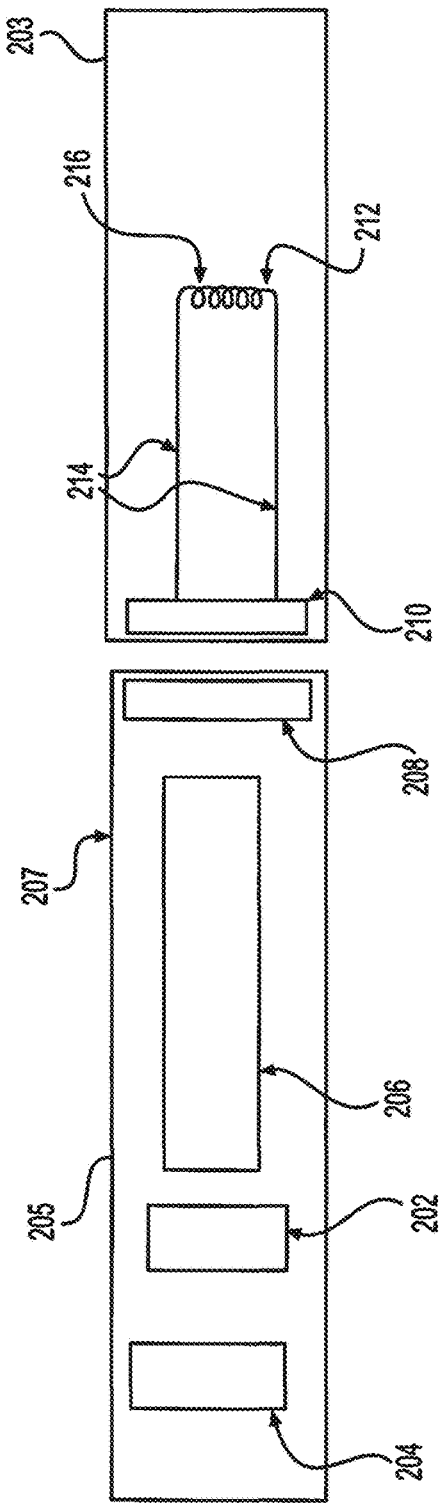
FIG. 2 is another diagram of an electronic cigarette.

FIG. 2 is another diagram of an electronic cigarette. FIG. 2 illustrates the battery portion 205 that includes the battery 206, the airflow sensor 204 and the controller 202. The battery portion 205 has a battery barrel 207 and a connector 208 that connects with the connector 210 of the cartridge 203. The cartridge 203 includes wires 214 for a heating coil 216 along with e-Liquid 212. The cartridge 203 may be disposable and replaceable, while the battery portion 205 may receive a new cartridge 203 whenever the e-Liquid of the former cartridge becomes depleted. When a new cartridge 203 is inserted (i.e. coupled to) into the battery portion 205 and the smoking action starts, the air flow sensor 204 detects the airflow and causes the controller 202 to activate the heating coil 216. The controller 202 activates the heating coil 216 through the connectors 208 and 210 and the wires 214 thereby causing the e-Liquid 212 to evaporate and form smoke or vapor.

Figure 3:
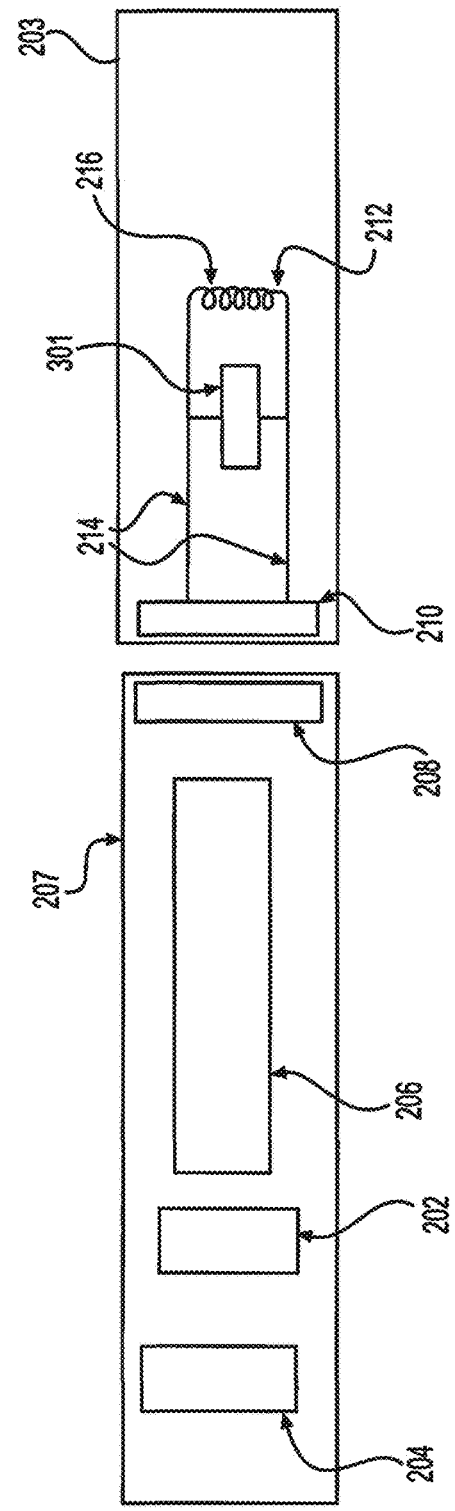
FIG. 3 is a diagram of an electronic cigarette with a memory in the cartridge.

FIG. 3 is another diagram of an electronic cigarette according to another embodiment. This embodiment may include an estimation mechanism to estimate the amount of e-Liquid 212 or residual e-Liquid 212 in the cartridge 203. As burning is directly connected to the amount of e-Liquid 212 in the cartridge 203, the knowledge or estimation of the e-Liquid in the cartridge 203 enables the controller 202 to adapt the power supplied to the heating coil 216 of the cartridge 203 such that burning is mitigated, or to alert a user that the cartomizer 113 should be disposed when there is not enough e-Liquid in the cartridge 203. When a new cartridge 203 is connected to the battery portion 205 and the smoking action starts, the air flow sensor 204 may detect the airflow and cause the controller 202 to read memory 301 that is in the cartridge 203. In one example, the memory 301 may be one bit non-volatile memory. The data that the controller 202 reads from the memory 301 may include the information about the residual smoking capability of the cartridge 203. This smoking capability information may include any of the exemplary parameters: residual e-Liquid 212, cartridge 203 manufacturing date, and cartridge 203 first smoking date as well as other statistical information. When the smoking action starts, the controller 202 measures and accumulates the actual power over time that the heating coil 216 gets, adds the result to the information from the memory, and stores the new data on the memory. In each sequence the controller 202 adapts the power to the heating coil 216 according to the data such that burning may be mitigated. For example, based on the last smoke data, if there is less e-Liquid, or the time from the first smoke is longer, or the original manufacturing date of the cartridge 203 is earlier, then the power to the heating coil 216 may be lower. When the data on the memory 301 approaches a value that represents a status wherein the smoke amount that may be generated due to the residual e-Liquid, or to the residual power in the battery 206 is less than the minimum defined, then the controller 202 may write obsolete code to the memory 301 and prevent the smoking action. When a cartridge 203 with obsolete code is plugged into the battery portion 205, smoking of the electronic cigarette may not be enabled by the controller 202.

Figure 4:
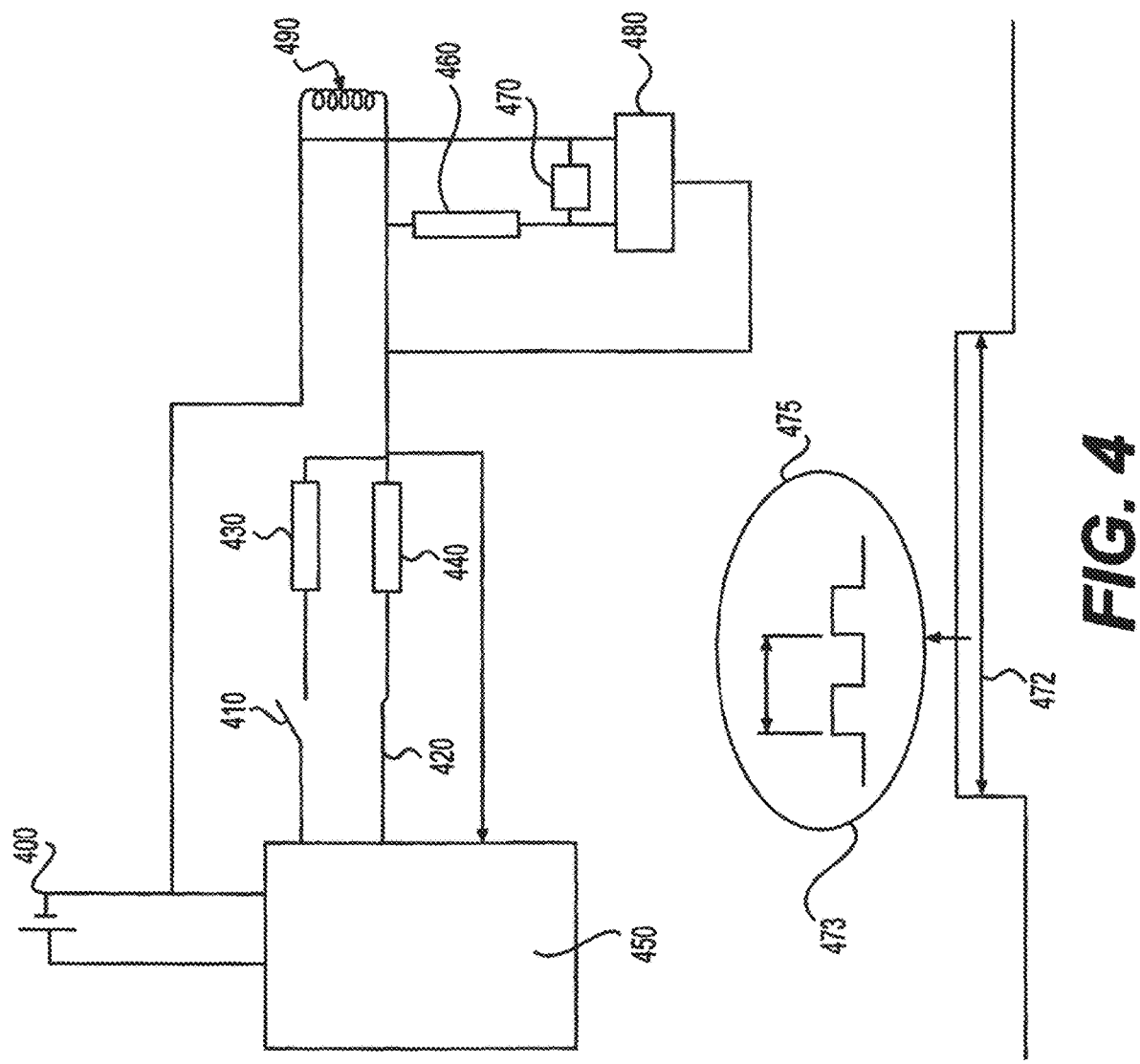
FIG. 4 is one embodiment of memory.

FIG. 4 is one embodiment of (one bit) memory. Other embodiments and memory types/sizes are possible. The electronics signals to a heating element such as heating coil 490 in a normal puff sequence may be based on a pulse width modulation ("PWM") control method. A normal puff time 472 may be about 2 seconds, and in this period, the control signals to the heating coil 490 are detailed in the blowup 473, that shows PWM over a small portion of time. The actual PWM 475 period may normally be about 10 milliseconds. Switches 410 and 420 are solid state switches that may be transistors or field-effect transistors ("FEY") or other electronic switching technology. A resistor 430 is used for heating coil 490 current measurements during operation of the heating coil 490. A resistor 440 is used for reading the one bit memory data when the power 400 is not supplied to the heating coil 490 through resistor 430. The resistor 430 is preferably a low value resistance resistor with respect to the resistor 440 which is preferably a high value resistor. A battery 400 powers a controller 450 and the heating coil 490, through the small value resistor 430 and the through switch 410 in a normal smoking mode. A memory chip (as used herein memory) 480 is preferably a one bit memory. The memory 480 may receive the supply voltage from the heating coil 490 power while smoking. This voltage passes to a capacitor 470 through a resistor 460, and charges the capacitor 470. When power supplied to the heating coil 490 stops, the one bit memory chip 480 may receive the power from the capacitor 470. The controller 450 sends data to the memory chip 480 by toggling the switch 410 in high frequency. This toggling may be fast and lasts for a short time and therefore does not activate the heating coil 490 to a level which increases the heat of the heating coil 490. The controller 450 reads data from the memory 480 by asserting the switch 410 open, closing switch 420 and reading the voltage on the high value resistor 440. The read/write operation may be fast and take less than about a millisecond. This operation, compared to the normal operation of the PWM sequence of the heating coil 490 (tens of milliseconds per cycle) is faster as shown through the operation of the coil, and also between smoking. Counting the accumulating power to the cartridge during its life may allow for a prediction of the complete end of life of the cartridge 203 so that the cartridge 203 may be disposed in advance of burning. The disposal process may include writing information to its memory.

Figure 5:
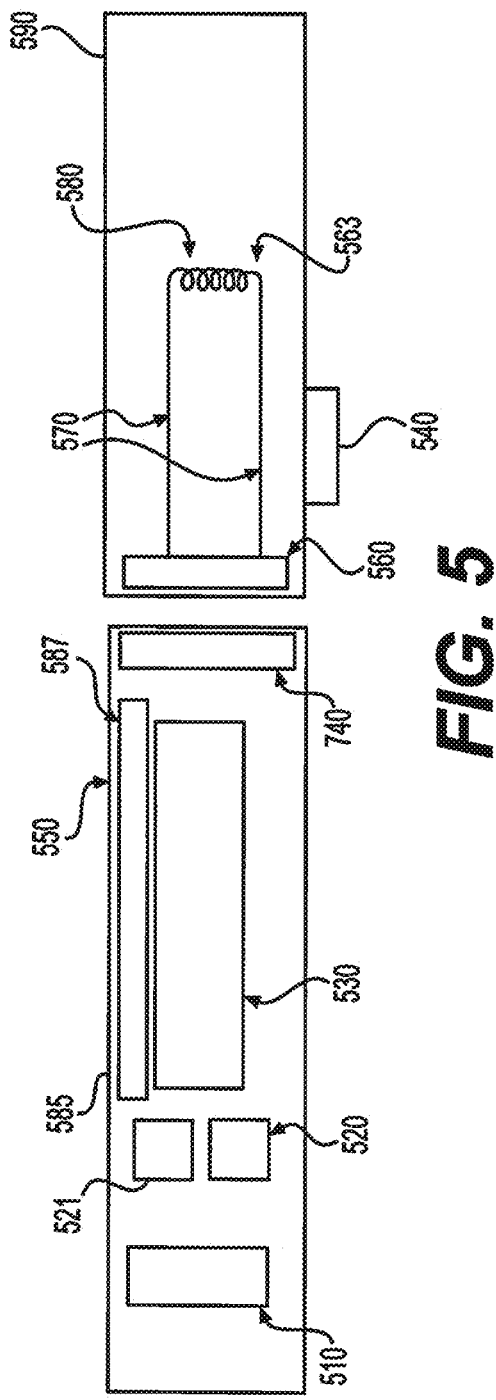
FIG. 5 is a diagram of an electronic cigarette with communications in the cartridge.

FIG. 5 is a diagram of an electronic cigarette with communications in a cartridge 590. This embodiment may be based on estimation mechanism to residual e-Liquid 563 in the cartridge 590. As burning is directly connected to the amount of e-Liquid 563 in the cartridge 590, the knowledge or estimation of the e-Liquid 563 in the cartridge 590 enables the controller 520 to adapt the power to the cartridge 590, or dispose of the cartridge completely when there is not enough e-Liquid 563 in the cartridge 590. When a new cartridge 590 is connected to a battery enclosure 585 via connectors 560 and wires 570 and the smoking action starts, the air flow sensor 510 detects the airflow and causes the controller 520 to read the wireless memory 540 that is in the cartridge 590. The read action is performed using a wireless transmitter/receiver 521 and an antenna 587 which it requires for the short distance transmission. The memory 540 may be a wireless memory in one embodiment (e.g. radio-frequency identification "RFID" technology) or may be based on near field communication ("NFC") technology, or other similar wireless memory technology that may not require a power source to be physically connected to the memory 540. The data that the controller 520 reads from the memory 540 may contain the information about the residual smoking capability of the cartridge 590. This smoking capability information may be a combination of the following parameters: residual e-Liquid 563, cartridge 590 manufacturing date, cartridge 590 first smoking date, expiration date and other statistical information. When the smoking action starts, the controller 520 measures and accumulates the actual power over time supplied by the battery 530 to the heating coil 580 by measuring the voltage and the current that the heating coil 580 gets, adds the result to the information of the memory 540, and stores the new data in the memory 540. In each sequence the controller 520 adapts the power supplied to the heating coil 580 from the battery 530 according to the last smoke data, such that when there is less liquid, or the time from the first smoke is longer, or the original manufacturing day of the cartridge is earlier, then the power supplied to the heating coil 580 is lowered. When the data of the memory 540 approaches a value that represents a status wherein the amount of smoke that may be generated due to the amount of residual e-Liquid in the cartridge 590 or to the amount of residual power in the battery 530 is less than a defined minimum, then the controller 520 may write obsolete code to the memory 540. Whenever a cartridge 590 with obsolete code is plugged into a battery 530, then smoking will not be enabled by the controller 520. Counting the accumulating power to a cartridge 590 during its life may be used to predict the complete end of life of the cartridge 590 and signal to a user to dispose of the cartridge 590 by writing information (obsolete code) to its memory 540 such that smoking will not be enabled by the controller 520.

The memory 540 may be based on short range wireless technology such as NFC. The RF part such as the wireless transmitter 521 in the battery barrel 550 of the electronic cigarette may match the same frequency as the memory 540 of the cartridge 590 and require a short antenna 587 because of the physically close position of the wireless transmitter 521 to the memory 540 and the electrical connection between the battery 530 and the heating coil 580 of the cartridge 563. The memory 540 may also require only a short antenna, and in some cases may be used without an antenna at all. The memory 540 may be embedded in one of the plastic parts of the cartridge 590, or implemented as a sticker that wraps on or sticks to the cartridge 590.

Another embodiment disclosed herein includes protecting the burning operation by measuring the heating coil temperature. In this embodiment, if the coil or the coil environment temperature increases above a certain level, then, the power to the heating coil stops. There may be at least two methods for detecting the temperature: 1) by controlling temperature as described with respect to the e-Cig of FIG. 2 and described below; and 2) the method described below with respect to FIGS. 6 and 7.

The heating coil 216, referring now back to FIG. 2, may be made of metal with an initial resistance at room temperature. While smoking, electric power is driven into the heating coil 216 which causes the heating coil 216 to increase in temperature which thereby changes the resistance of the heating coil 216. If the cartridge 203 is filled up with e-Liquid 212, then the heating coil 216 temperature may have the maximum temperature at the boiling point of the e-Liquid 212. When the e-Liquid 212 is evaporated and not enough e-Liquid 212 is present on or in close proximity to the heating coil 216, then the heating coil 216 temperature will increase, according to the following formula:

$$R(T)=R_0[1+\alpha(T-T_0)]$$

wherein R(T) is the resistance of the heating coil 216 at high temperature, $R_0$ is the resistance of the heating coil 216 at room temperature, $T_0$ is room temperature, $\alpha$ is the temperature coefficient of the heating coil material, and T is the heating coil 216 temperature during smoking. When T increases above a certain value, R will also increase, whereupon a controller 202 will stop the power from the battery 206 to the heating coil 216. One method for measuring the heating coil 216 resistance is described with respect to FIG. 6.

Figure 6:
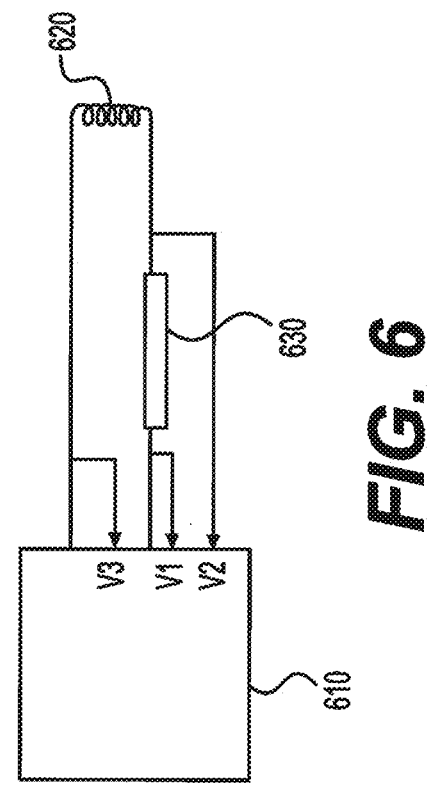
FIG. 6 is a circuit diagram for measuring coil resistance.

As shown in FIG. 6, a controller 610 supplies power to the heating coil 620 from a battery (not shown) through a low resistance resistor 630. The two voltage points on the resistor 630 can be measured using an analog to digital converter. The voltage points can be subtracted from each other by the controller wherein the result is divided by the resistance $R_0$ of the heating coil 620 to find the current through the heating coil 620. The voltage across the heating coil 620 may be calculated by subtracting the analog input voltage V2 from V3. The result of which can be divided by the aforementioned current result which will give the heating coil 620 resistance. Those measurements are performed during the smoking action, while the heating coil 620 temperature is varying. Therefore the controller 610 may take many measurements and monitor the heating coil 620 resistance such that the R(T) resistance of the heating coil 620 does not exceed the maximum resistance. The changing of the heating coil 620 resistance as a result of temperature changes is noisy process and the results may therefore vary. Accordingly, the controller 610 may average many samples of the coil resistance R(T) at different times. According to the formula:

$$R(T)=R_0[1+\alpha(T-T_0)]$$

The controller may calculate the resistance of the heating coil 620 also at room temperature and then calculate the actual heating coil 620 temperature.

Figure 7:
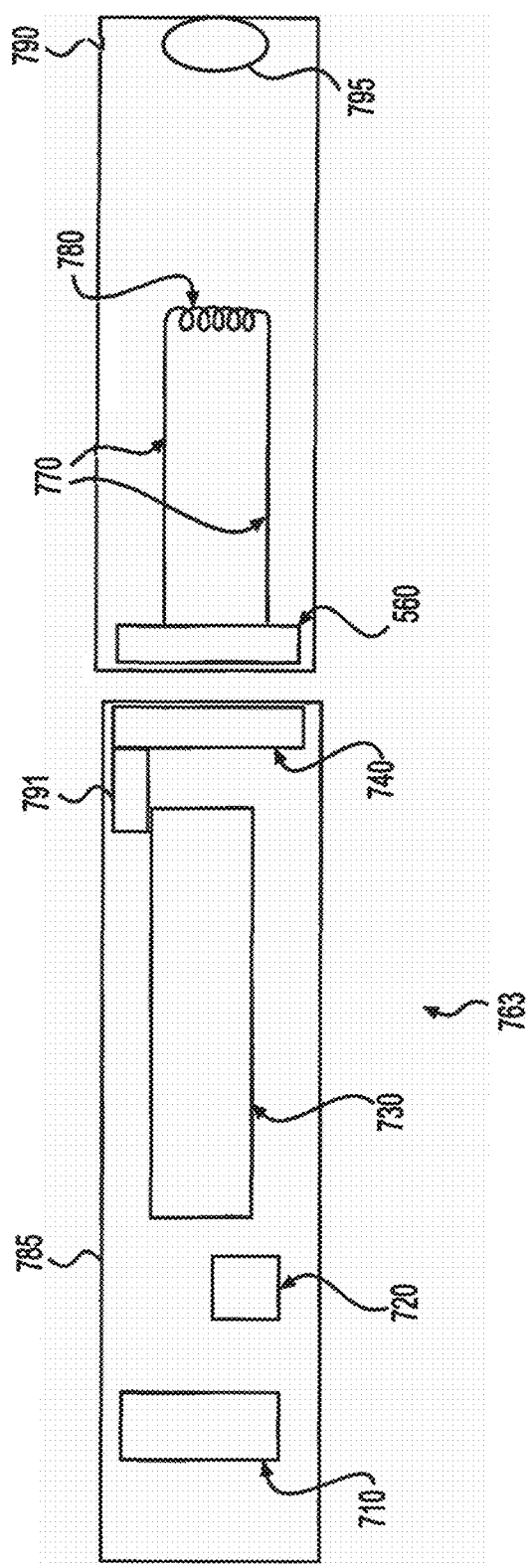
FIG. 7 is another diagram illustrating temperature measurement in an electronic cigarette.

Referring now to FIG. 7 is a diagram illustrating a second method for temperature measurement in an electronic cigarette. In this embodiment, wires 770 are made from the same material as a heating coil 780 and may become heated with a reference to the heating coil 780 current. A temperature sensor (e.g. thermocouple) 791 is connected to a connector 740 of a battery portion 785 of the electronic cigarette. The connector 740 is made of metal and may be connected to a connector 560 of the cartridge 790 that is also a metal part. Metals transfer heat, so the heating coil 780 that is connected to wires 770 (which are made of metal), to the connector 560, and to the connector 740 causes the temperature sensor (e.g. thermocouple) 791 to increase in heat as well. The temperature at the temperature sensor 791 may be less than the heating coil 780 temperature, but may still give a good indication to the controller 720 of the coil temperature. The temperature sensor 791 may be connected to the controller 720 and may be measured during smoking. The relationship between the temperature that is sensed by the temperature sensor 791 and the heating coil 780 temperature may be different between different cigarette assemblies and can be found out through experimentation of each assembly. While smoking, the air sensor 710 detects air flow and the controller 720 samples the temperature values of the heating coil 780 and compares the temperature values to a stored value which can be used to suggest that the heating coil 780 temperature is coming close to a burning point. When this value is reached, the controller 720 stops the power from the battery 730 to the heating coil 780 of the e-Cig 763. In one example the user is notified by changing a LED 795 light color, or any other method, such as sound.

Another embodiment of a system as disclosed herein may utilize a temperature sensing method as described in any of the previous embodiments for close loop control over the heating coil temperature. During the smoking action, the temperature of the heating coil may be sensed through changes in resistance thereof. If the temperature of the heating coil, as being sensed by a resistance method or a temperature sensor, increases, then the controller can reduce the power supplied from the battery to the heating coil, and if the temperature of the heating coil reduces, then the controller can increase the power supplied from the battery to the heating coil.

Placing memory inside a disposable cartridge of the e-Cig may be used to provide additional applications, including storing smoking habits of a user, manufacturing date, etc. The age of the cartridge may also be useful to store for guaranteeing freshness. Electrically storing the manufacturing date or storing the opening date of the cartridge may be one way of protecting a smoker. Using the NFC technology on the cartridge may allow for communication with mobile phones or other computing devices. The memory may be part of the NFC chip.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

I claim:

1. An electronic vaping device comprising:
   a cartridge including
      a pre-vapor formulation reservoir configured to retain a pre-vapor formulation,
      a heating element configured to heat pre-vapor formulation drawn from the pre-vapor formulation reservoir,
      a capacitor connected to the heating element, the capacitor configured to be charged by power applied to the heating element,
      a memory connected in parallel with the capacitor, the memory configured to
         receive a supply voltage from the power applied to the heating element when the power is applied to the heating element,
         receive a supply voltage from the capacitor when the power is not applied to the heating element; and
   a power supply section releasably engaged with the cartridge, the power supply section including
      a power supply configured to provide power to the electronic vaping device, and
      processing circuitry configured to control power to the heating element.

2. The electronic vaping device of claim 1, wherein the processing circuitry is configured to:
   compute a resistance of the heating element during vaping;
   determine a temperature of the heating element based on the resistance of the heating element; and
   control power to the heating element based on the temperature of the heating element.

3. The electronic vaping device of claim 2, wherein the processing circuitry is configured to compute the resistance of the heating element a plurality of times during vaping.

4. The electronic vaping device of claim 3, wherein the processing circuitry is configured to average a subset of the plurality of resistances to compute the resistance of the heating element during vaping.

5. The electronic vaping device of claim 1, wherein
   the memory is configured to store a threshold temperature for the heating element; and
   the processing circuitry is configured to stop the power supply from providing power to the electronic vaping device in response to determining that a temperature of the heating element has reached the threshold temperature for the heating element.

6. The electronic vaping device of claim 1, further comprising a resistor-capacitor (RC) circuit coupled to the heating element, the RC circuit including a resistor and the capacitor.

7. The electronic vaping device of claim 1, further comprising a temperature sensor configured to measure a temperature within the electronic vaping device proximate to the heating element.

8. The electronic vaping device of claim 7, wherein
   the memory is configured to store a threshold temperature for the heating element; and
   the processing circuitry is configured to stop the power supply from providing power to the electronic vaping device in response to the temperature within the electronic vaping device being within a range of the threshold temperature for the heating element.

9. The electronic vaping device of claim 8, wherein the processing circuitry is configured to output an indication that the power supply is powered off in response to the temperature within the electronic vaping device being within the range of the threshold temperature for the heating element.

10. The electronic vaping device of claim 9, wherein the indication is at least one of a change in an LED light color or a sound.

11. A cartridge for an electronic vaping device, the cartridge comprising:
    a pre-vapor formulation reservoir configured to retain a pre-vapor formulation;
    a heating element configured to heat pre-vapor formulation drawn from the pre-vapor formulation reservoir;
    a capacitor connected to the heating element, the capacitor configured to be charged by power applied to the heating element; and
    a memory connected in parallel with the capacitor, the memory configured to
       receive a supply voltage from the power applied to the heating element when the power is applied to the heating element, and
       receive a supply voltage from the capacitor when the power is not applied to the heating element.

12. The cartridge of claim 11, further comprising a resistor-capacitor (RC) circuit coupled to the heating element, the RC circuit including a resistor and the capacitor.

13. The cartridge of claim 11, wherein the cartridge is configured to be releasably engaged with a power supply section, the power supply section including a power supply configured to provide power to the electronic vaping device and processing circuitry configured to control power to the heating element.

14. The cartridge of claim 13, wherein the processing circuitry is configured to:

compute a resistance of the heating element during vaping;

determine a temperature of the heating element based on the resistance of the heating element; and control power to the heating element based on the temperature of the heating element.

15. The cartridge of claim 14, wherein the processing circuitry is configured to compute the resistance of the heating element a plurality of times during vaping.

16. The cartridge of claim 15, wherein the processing circuitry is configured to average a subset of the plurality of resistances to compute the resistance of the heating element during vaping.

17. The cartridge of claim 13, wherein the memory is configured to store a threshold temperature for the heating element; and the processing circuitry is configured to stop the power supply from providing power to the electronic vaping device in response to determining that a temperature of the heating element has reached the threshold temperature for the heating element.

18. The cartridge of claim 13, further comprising a temperature sensor configured to measure a temperature within the electronic vaping device proximate to the heating element.

19. The cartridge of claim 18, wherein the memory is configured to store a threshold temperature for the heating element; and the processing circuitry is configured to stop the power supply from providing power to the electronic vaping device in response to the temperature within the electronic vaping device being within a range of the threshold temperature for the heating element.

20. The cartridge of claim 19, wherein the processing circuitry is configured to output an indication that the power supply is powered off in response to the temperature within the electronic vaping device being within the range of the threshold temperature for the heating element.

* * * * *